United States Patent
Seimiya

(10) Patent No.: US 6,565,158 B2
(45) Date of Patent: May 20, 2003

(54) AUTOMOTIVE ROAD WHEEL AND ATTACHING STRUCTURE OF THE SAME

(75) Inventor: Shinji Seimiya, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/006,703

(22) Filed: Dec. 10, 2001

(65) Prior Publication Data

US 2002/0089230 A1 Jul. 11, 2002

(51) Int. Cl.[7] ................................................ B60B 27/06
(52) U.S. Cl. ..................... 301/6.91; 301/6.21; 181/207; 74/443
(58) Field of Search ........................ 301/6.91, 35.621, 301/35.623, 35.625, 35.626, 35.629, 35.631, 105.1, 124.1, 6.1; 181/207; 74/443

(56) References Cited

U.S. PATENT DOCUMENTS

| | | | |
|---|---|---|---|
| 1,769,903 A | * | 7/1930 | Baker |
| 1,818,448 A | * | 8/1931 | Baker |
| 1,958,642 A | * | 5/1934 | Rosenberg |
| 2,352,487 A | * | 6/1944 | McNamara |
| 4,066,058 A | * | 1/1978 | Anderkay ............... 181/207 X |
| 4,067,184 A | * | 1/1978 | Johnson, Jr. ................. 181/207 |
| 5,401,079 A | * | 3/1995 | Rooney |
| 5,538,114 A | * | 7/1996 | White et al. |
| 6,345,686 B1 | * | 2/2002 | Jablonka et al. ............. 181/207 |

* cited by examiner

*Primary Examiner*—Russell D. Stormer
(74) *Attorney, Agent, or Firm*—Rader Fishman & Grauer

(57) ABSTRACT

An automotive road wheel is disclosed, comprising: a disk portion fixed to an axle portion of a vehicle by a fastener; and a vibration isolation mechanism provided in a place where the disk portion is fixed by the fastener. In addition, an attaching structure of an automotive road wheel is disclosed, comprising: an axle hub attached to an axle configuration; a road wheel attached to the axle hub; and a vibration isolation mechanism interposed between the axle configuration and the axle hub.

13 Claims, 4 Drawing Sheets

AUTOMOTIVE ROAD WHEEL AND ATTACHING STRUCTURE OF THE SAME

BACKGROUND OF THE INVENTION

The present invention relates to an automotive road wheel and an attaching structure of the same. More specifically, the present invention relates to an automotive road wheel having its sound vibration performance improved without any substantial reductions in driving stability, and to an attaching structure of the same.

Generally, the automotive road wheel was mounted on an axle portion connected to a car body through a suspension or the like by fastening its disk portion with bolts and nuts, accordingly achieving both driving stability and sound vibration performance. In recent years, however, with the appearance of higher-class type passenger cars, there have been stronger requests for further improvements, especially on ride comfort and sound vibration performance with respect to road noise or the like.

As a countermeasure for such requests, Japanese patent application Kokai publication No. 6-344703 proposes a road wheel, which is designed to damp vibration by spot-welding a plurality of places in a circumferential direction between the disk portion and a rim portion separated from each other, and by providing a viscoelastic substance such as asphalt, rubber or the like in a nonwelded portion. However, according to this countermeasure, since the disk portion and the rim portion had to be prepared as components independent of each other, it was impossible to use an existing road wheel, necessitating the preparation of a new metal mold as a dedicated wheel. Consequently, the conventional road wheel had drawbacks including an increase in manufacturing costs, designing constraints, etc.

SUMMARY OF THE INVENTION

An object of the present invention is to provide an automotive road wheel, which is capable of improving sound vibration performance without any substantial reductions in driving stability only by reconstructing a part of a structure of an existing road wheel.

Another object of the present invention is to provide an attaching structure of an automotive road wheel, which is capable of improving sound vibration performance without any substantial reductions in driving stability while maintaining a road wheel of a conventional structure intact.

In order to achieve the first object described above, in accordance with the present invention, an automotive road wheel is provided, comprising: a disk portion fixed to an axle portion of a vehicle by a fastener; and a vibration isolation mechanism provided in a place of fixing the disk portion by the fastener.

Since the vibration isolation mechanism is provided in the place where the disk portion is fastened to the axle portion of the vehicle, vibration transmitted from a tire through the disk portion to the axle portion is damped by the vibration isolation mechanism, thereby improving the sound vibration performance. Moreover, since an amount of displacement in the fastening place in an axial direction is small, no substantial reductions occur in the driving stability.

In addition, since the vibration isolation mechanism can be mounted only by partially reconstructing an existing road wheel structure, a metal mold for the conventional road wheel can be directly used, enabling low—cost manufacturing.

In order to achieve the second object described above, in accordance with the present invention, an attaching structure of an automotive road wheel is provided, comprising: an axle hub attached to an axle configuration; a road wheel attached to the axle hub; and a vibration isolation mechanism provided between the axle configuration and the axle hub.

Since the vibration isolation mechanism is interposed between the axle configuration and the axle hub, the vibration transmitted from the tire through the disk portion of the road wheel to the axle portion is damped by the vibration isolation mechanism, thereby improving the sound vibration performance. Moreover, since the amount of the variable displacement in the axial direction is small, no substantial reductions occur in the driving stability. In addition, the vibration isolation mechanism can be mounted without any alterations to the existing road wheel at all, enabling the low-cost manufacturing.

According to the present invention, in any of the cases of the road wheel and its attaching structure, the vibration isolation mechanism is constructed regarding the damping material as a main portion. For the damping material, no particular limitation is placed as long as the material has a characteristic of damping the vibration transmitted from the road wheel to the axle portion. For example, enumerated can be rubber, thermoplastic resin, a thermoplastic resin elastomer composition prepared by blending the thermoplastic resin with rubber, and the like. Also, when necessary, a damping steel plate can be used as the damping material.

No particular limitation is placed on the rubber used for the damping material. Any of synthetic rubber and natural rubber can be used. Moreover, no particular limitation is placed on the thermoplastic resin, as long as it has a characteristic of damping vibration.

The thermoplastic resin elastomer composition has a viscoelastic characteristic, which is prepared by blending the thermoplastic resin with rubber. Especially, one is preferable, which is prepared in such a manner that the thermoplastic resin having a peak of tan δ in a range of 0° C. to 150° C. is set to be a continuous phase, and a rubber component at least partially cross-linked and having a peak of tan δ in a range of −100° C. to 0°C. is dispersed in the continuous phase. In this case, a temperature indicating the peak of tan δ is one, at which a temperature dependence curve of tan δ is obtained under the condition of 20 Hz based on JIS K7198, and the curve indicates a peak.

For the rubber used for the thermoplastic resin elastomer composition, enumerated can be butyl-containing rubber, olefin-containing rubber, natural rubber and the like. In addition, for the thermoplastic resin, enumerated can be polyamide-containing resin, polypropylene-containing resin, polyester-containing resin and the like.

The structure of the vibration isolation mechanism used for the present invention preferably includes the damping material joined unitarily between the outer and inner cylinders. Also, it is preferable to join the damping material unitarily with the outer and inner cylinders by baking or adhesive. For the damping material, the foregoing material can be used, and for the outer and inner cylinders, metal such as copper, aluminum or the like, and fiber-reinforced resin can be used.

In such a unitary structure composed of the outer cylinder, the damping material and the inner cylinder, in the case of the road wheel of the present invention, the road wheel can be mounted by pressing the outer cylinder into the disk portion of the road wheel, and fixing the inner cylinder to the axle portion of the vehicle by the fastener such as bots and nuts. In the case of the vibration isolation mechanism described above, an amount δb of variable displacement upon application of a load in a direction orthogonal to the axial direction of the fastener (up-and-down direction of the vehicle) is preferably set to be larger than an amount δa of variable displacement upon application of the same load in the axial direction (left-and-right direction of the vehicle). Because of the large amount δb of variable displacement in the direction orthogonal to the axial direction of the fastener, ride comfort and road noise are reduced. Because of the small amount δa of variable displacement in the axial direction of the fastener, good driving stability is maintained without being lowered.

Means for obtaining the foregoing characteristic can be achieved by setting a thickness a of the damping material held in the axial direction of the fastener to be smaller than a thickness b held in a direction orthogonal to the axial direction, for example in the damping material provided between the outer and inner cylinders. In addition, the damping material provided between the outer and inner cylinders can be obtained by setting a difference in an elastic modulus between a damping material A held in the axial direction of the fastener and a damping material B held in the direction orthogonal to the axial direction, and by setting the elastic modulus of the damping material A to be larger than that of the damping material B.

In the case of the road wheel attaching structure of the present invention, the axle portion is a structure composed of the axle configuration and the axle hub, and the road wheel is fixed to the axle hub. When the axle configuration is a non-drive shaft, the axle hub is rotatably supported on the axle configuration by providing a bearing inside. When the axle configuration is a drive shaft, the axle hub is directly fixed to the drive shaft.

As in the case of the vibration isolation mechanism used for the road wheel, the structure of the vibration isolation mechanism used for the present invention preferably includes the damping material joined unitarily between the outer and inner cylinders. It is preferable to join the damping material unitarily with the outer and inner cylinders by baking or adhesive. The foregoing material is used for the damping material, and for the outer and inner cylinders, metal such a copper, aluminum or the like, fiber-reinforced resin and the like can be used.

In the automotive road wheel attaching structure of the present invention, the vibration isolation mechanism constructed in the foregoing manner is inserted between the axle configuration and the axle hub so as to be interposed therebetween. When the axle configuration is the drive shaft, the inner cylinder is fixed on the axle configuration, and the outer cylinder is fixed in a fitting hole of the axle hub. When the axle configuration is the non-drive shaft, the inner cylinder is fixed on the axle configuration similarly to the case of the drive shaft. However, the outer cylinder is pressed into the inside of the bearing loaded inside the axle hub.

For the vibration isolation mechanism attached when the axle configuration is the non-drive shaft, preferably, stiff pieces are respectively inserted into places located in the front and rear sides of the vehicle driving direction of the damping material in the vibration isolation mechanism. For the stiff piece, for example, a metal plate, a ceramic plate, a resin plate and the like can be used. By the insertion of such stiff pieces, the amount of variable displacement in the back-and-forth direction orthogonal to the axle configuration is reduced for the vibration isolation mechanism. Thus, the driving stability can be improved.

In addition, for the foregoing vibration isolation mechanism, preferably, an amount b' of variable displacement upon application of a load in a direction orthogonal to the axial direction of the fastener (up-and-down direction of the vehicle) is set to be larger than an amount δa' of variable displacement upon application of the same load in the axial direction (left-and-right direction of the vehicle). Because of the large amount δb' of variable displacement in the direction orthogonal to the axial direction of the fastener, ride comfort and road noise are reduced. Because of the small amount δa' of variable displacement in the axial direction of the fastener, good driving stability can be maintained without being lowered.

Means for obtaining the foregoing characteristic can be achieved by setting a thickness a' of the damping material held in the axial direction of the fastener to be smaller than a thickness b' held in a direction orthogonal to the axial direction, for example in the damping material provided between the outer and inner cylinders. In addition, the damping material provided between the outer and inner cylinders can be achieved by setting a difference in an elastic modulus between a damping material A' held in the axial direction of the fastener and a damping material B' held in the direction orthogonal to the axial direction, and by setting the elastic modulus of the damping material A' to be larger than that of the damping material B'.

DESCRIPTION OF THE PREFERRED EMBODIMENTS

Figure 1:
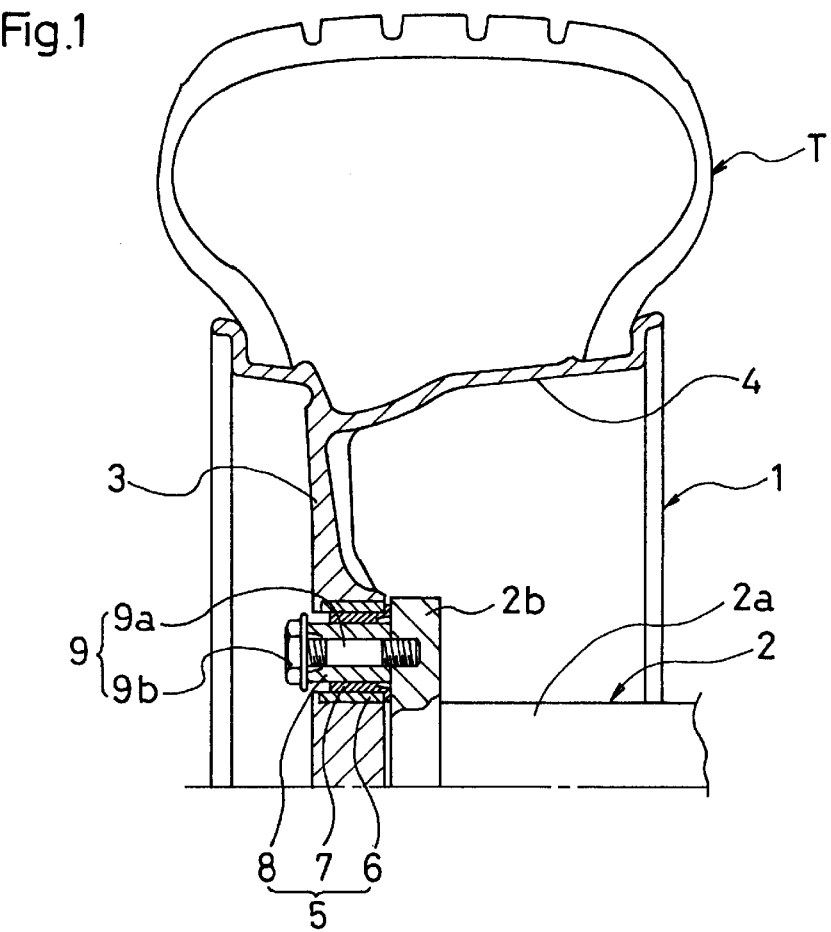
FIG. 1 is a semi-sectional view of an automotive road wheel according to an embodiment of the present invention.

FIG. 1 shows an example of an automotive road wheel according to the present invention.

In FIG. 1, a reference numeral 1 denotes a road wheel mounted with a pneumatic tire T; and a reference numeral 2 denotes an axle portion of a vehicle. The road wheel 1 comprises a disk portion 3 and a rim portion 4, which are unitarily formed. The axle portion 2 of the vehicle includes an axle configuration 2a and a hub 2b.

The disk portion 3 of the road wheel 1 is fastened and fixed to the hub 2b of the axle portion 2 by a fastener 9 with a vibration isolation mechanism 5 interposed therebetween. The vibration isolation mechanism 5 is constituted of a damping material 7, an outer cylinder 6 and an inner cylinder 8, which are united by adhering the damping material between the cylinders. The outer cylinder 6 is pressed into a hole provided in the disk portion 3, and the inner cylinder 8 is fastened and fixed to the hub 2b of the axle portion 2 by the fastener 9.

The fastener 9 includes a stud bolt 9a planted in the hub 2b, and a nut 9b engaged with the stud bolt 9a. The hole of the disk portion 3, into which the outer cylinder 6 of the vibration isolation mechanism 5 is pressed, can be easily formed only by enlarging a bolt hole originally provided in a disk portion of a conventional road wheel with a drill or a reamer.

Since the disk portion 3 of the road wheel 1 is fastened to the axle portion 2 of the vehicle with the vibration isolation mechanism 5 interposed therebetween as described above, vibration transmitted from the pneumatic tire T through the rim portion 4 and the disk portion 3 to the axle portion 2 is damped by the vibration isolation mechanism 5, thereby improving sound vibration performance for reducing an amount of vibration transmitted to a car body side. Moreover, since the vibration isolation mechanism 5 is fastened to the axle portion 2 in parallel with the axle configuration with the inner cylinder 8, an amount of variable displacement in an axial direction is small, and thus no substantial reductions are observed in driving stability.

In addition, regarding the vibration isolation mechanism 5, since the road wheel having a conventional structure can be mounted only by partially grinding a fastening place (bolt hole), a metal mold for the conventional road wheel can be directly used without manufacturing any dedicated road wheels, enabling low-cost manufacturing. Moreover, since the conventional road wheel can be used, no designing constraints are imposed.

Figure 2:
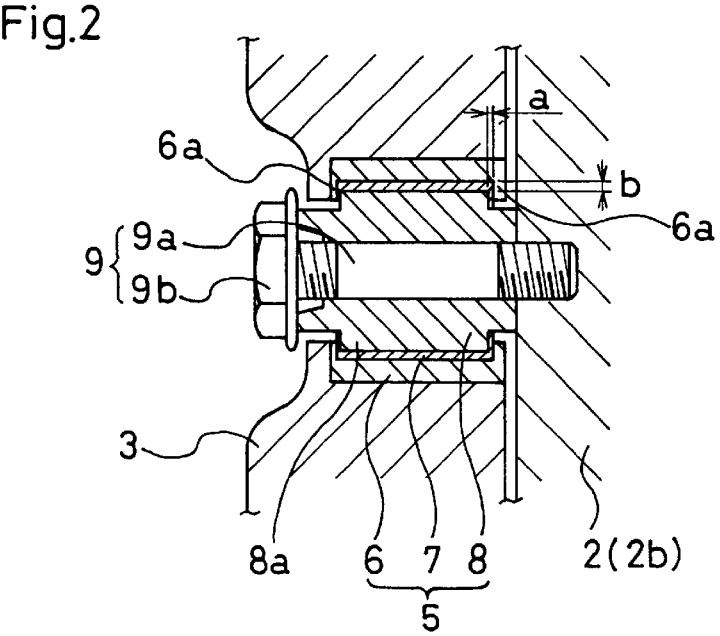
FIG. 2 is a vertical sectional view showing another example of a vibration isolation mechanism used for the road wheel of the present invention.

FIG. 2 shows another example of a vibration isolation mechanism provided in the automotive road wheel of the present invention.

The vibration isolation mechanism 5 shown in FIG. 2 is constructed in such a manner that flange portions 6a and 6a bent inward in hook shapes are respectively formed in both ends of the outer cylinder 6, a center of the inner cylinder 8 is formed to be a large-diameter portion 8a, and this large-diameter portion 8a is inserted between both flange portions 6a and 6a of the outer cylinder 6. With such a constitution, the flange portion 6a of the outer cylinder 6 and the large-diameter portion 8a of the inner cylinder 8 partially face each other in an axial direction, and a thickness a of the damping material 7 interposed between the outer and the inner cylinders in the axial direction is smaller than a thickness b of the same in a diameter direction between the outer and inner cylinders 6 and 8.

Thus, since the thickness a of the damping material 7 held in the axial direction between the outer and inner cylinders 6 and 8 is smaller than the thickness b of the same held in the diameter direction, it is possible to set an amount δb of variable displacement upon application of a load to the vibration isolation mechanism 5 in a direction orthogonal to the axial direction (up-and-down direction of the vehicle) to be larger than an amount ba of variable displacement upon application of the same load in the axial direction (left-and-right direction of the vehicle). As a result, it is possible to improve the sound vibration performance without any substantial reductions in the driving stability.

Figure 3:
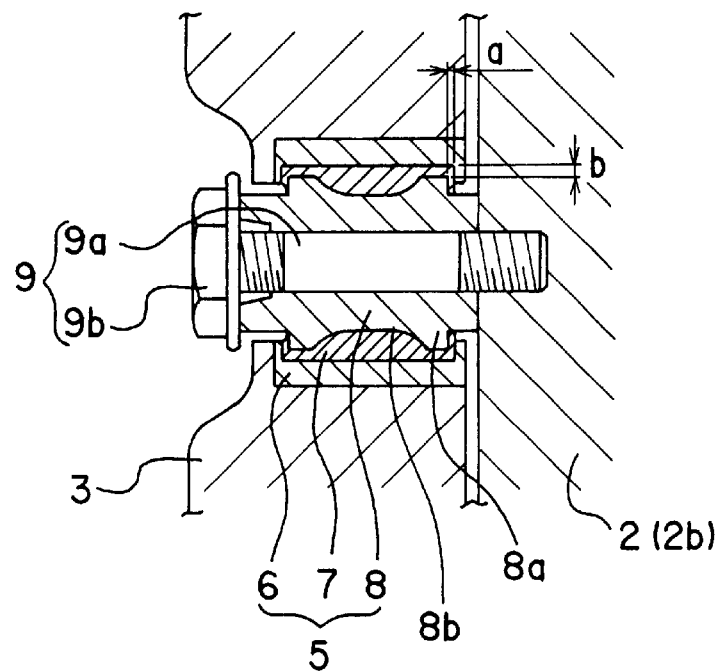
FIG. 3 is a vertical sectional view showing yet another example of a vibration isolation mechanism used for the road wheel of the present invention.

FIG. 3 shows yet another example of a vibration isolation mechanism provided in the automotive road wheel of the present invention.

The vibration isolation mechanism 5 shown in FIG. 3 is different from the one shown in FIG. 2 in that a concave enveloping bent portion 8b is formed in the center of the inner cylinder 8.

Thus, since the enveloping bent portion 8b is formed in the center of the inner cylinder 8, a volume of the damping material 7 in the diameter direction (direction orthogonal to the axial direction) is increased more than that of the vibration isolation mechanism of FIG. 2, making it possible to further improve the sound vibration performance compared to the case of FIG. 2.

Figure 4:
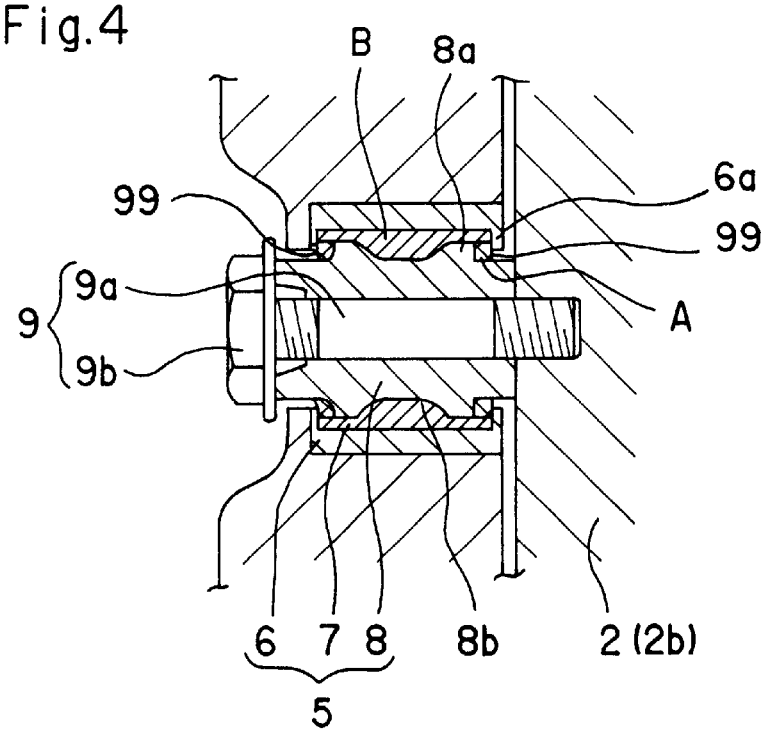
FIG. 4 is a vertical sectional view showing still yet another example of a vibration isolation mechanism used for the road wheel of the present invention.

FIG. 4 shows still yet another example of a vibration isolation mechanism provided in the automotive road wheel of the present invention.

This vibration isolation mechanism 5 includes two types of damping materials different in an elastic modulus, as the damping material 7. Ring members 99 of damping material A of a larger elastic modulus is provided in a place held in the axial direction between the flange 6a of the outer cylinder 6 and the large-diameter portion 8a of the inner cylinder 8; and a damping material B of an elastic modulus smaller than that of the damping material A is provided in a place held in the diameter direction between the outer and inner cylinders 6 and 8.

Thus, since the two types of damping materials A and B having different elastic moduli (elastic modulus of A>elastic modulus of B) are disposed between the outer and inner cylinders 6 and 8 as described above, it is possible to set the amount δb of variable displacement upon application of a load to the vibration isolation mechanism 5 in the direction orthogonal to the axial direction (up-and-down direction of the vehicle) to be larger than the amount δa of variable displacement upon application of the same load in the axial direction (left-and-right direction of the vehicle). As a result, the sound vibration performance can be improved without any substantial reductions in the driving stability.

Figure 5:
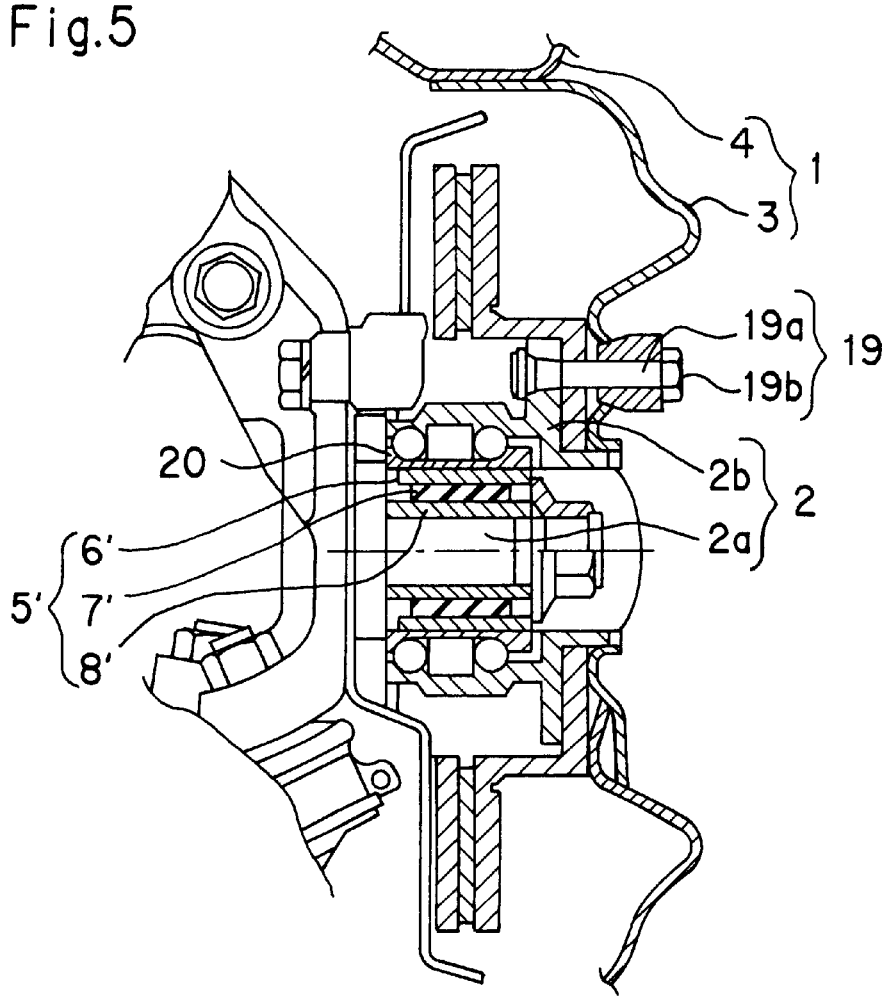
FIG. 5 is a semi-sectional view of an attaching structure of an automotive road wheel according to an embodiment of the present invention.

FIG. 5 shows an example of an attaching structure of an automotive road wheel according to the present invention.

In FIG. 5, a reference numeral 1 denotes a road wheel mounted with a pneumatic tire (not shown); and a reference numeral 2 denotes an axle portion of a vehicle.

The axle portion 2 includes an axle configuration 2a as a non-drive shaft, and an axle hub 2b. A bearing 20 is inserted into the inside of the axle hub 2b, and a vibration isolation mechanism 5' is interposed between the bearing 20 and the axle configuration 2a. The road wheel 1 comprises a disk portion 3 and a rim portion 4. The disk portion 3 is fastened and fixed to the hub 2b of the axle portion 2 by a fastener 9 composed of a bolt 19a and a nut 19b. The vibration isolation mechanism 5' is constituted of a damping material 7', an inner cylinder 6' and an outer cylinder 8', which are united by adhering the damping material between the outer and inner cylinders. The outer cylinder 6' is pressed into the inside of the bearing 20 fixed in the axle hub 2b, and the inner cylinder 8' is fixed onto the axle configuration 2a.

Since the vibration isolation mechanism 5' is interposed between the axle configuration 2a and the hub 2b of the axle portion 2 as described above, vibration transmitted from the disk 3 of the road wheel 1 through the fastener 19 to the axle hub 2b is damped by the vibration isolation mechanism 5', thereby improving sound vibration performance for reducing an amount of vibration transmitted to the axle configuration 2a. Moreover, since the vibration isolation mechanism 5' includes the damping material 7' adhered and fixed between the outer and inner cylinders 6' and 8' in a cylindrical shape, an amount of displacement in an axial direction is suppressed to be small, and thus no substantial reductions occur in driving stability.

In addition, since no changes are made for reconstructing the road wheel 1 when the vibration isolation mechanism 5' is inserted, a metal mold for a conventional road wheel can be directly used, enabling low-cost manufacturing. Moreover, since the conventional road wheel can be used, no designing constraints are imposed.

Figure 6:
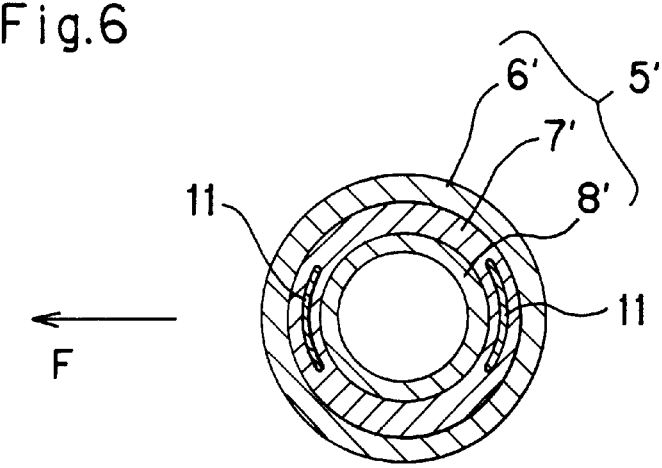
FIG. 6 is a transverse sectional view showing another example of a vibration isolation mechanism used for the attaching structure of the automotive road wheel of the present invention.

FIG. 6 shows another example of a vibration isolation mechanism used for the attaching structure of the automotive road wheel of the present invention.

The vibration isolation mechanism shown in FIG. 6 is constructed in such a manner that in the damping material 7' concentrically held between the outer and inner cylinders 6' and 8', stiff pieces 11 and 11 are respectively inserted into places located in the front and rear sides of a vehicle advancing direction F so as to be extended in the axial direction. The stiff piece 11 only needs to be stiffer than the damping material 7', and for example, a metal plate, a ceramic plate, a resin plate and the like can be used therefor. The insertion of the stiff piece 11 reduces an amount of variable displacement in a back-and-forth direction orthogonal to the axle configuration 2a for the vibration isolation mechanism 5', making it possible to improve the driving stability.

Figure 7:
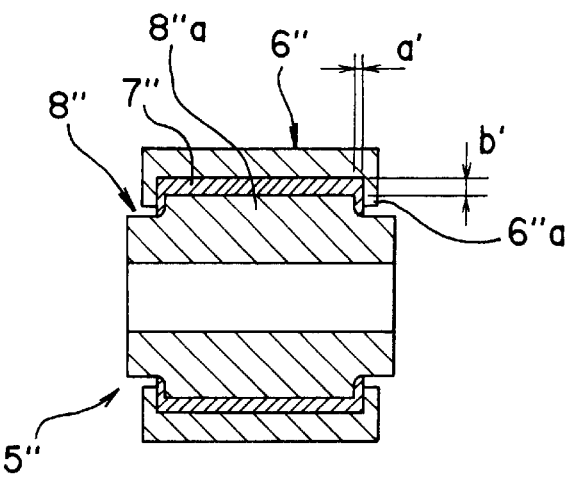
FIG. 7 is a vertical sectional view showing yet another example of a vibration isolation mechanism used for the attaching structure of the automotive road wheel of the present invention.

FIG. 7 shows yet another example of a vibration isolation mechanism used for the present invention.

The vibration isolation mechanism 5" shown in FIG. 7 is constructed in such a manner that flange portions 6"a and 6"b bent inward in hook shapes are respectively formed in both ends of the outer cylinder 6", a large-diameter portion 8"a is formed in a center of the inner cylinder 8' on the other hand, and this large-diameter portion 8"a is inserted between both flange portions 6"a and 6"b of the outer cylinder 6". With such a constitution, the flange portion 6"a of the outer cylinder 6" and the large-diameter portion 8"a of the inner cylinder 8" partially face each other in the axial direction, and a thickness a' of the damping material 7" interposed between the outer and inner cylinders in the axial direction is smaller than a thickness b' of the same in the diameter direction between the outer and inner cylinders 6" and 8" (large-diameter portion 8"a).

Thus, since the thickness a' of the damping material 7" held in the axial direction between the outer and inner cylinders 6" and 8" is smaller than the thickness b' of the same held in the diameter direction, it is possible to set an amount δb' of variable displacement upon application of a load to the vibration isolation mechanism 5" in a direction orthogonal to the axial direction (up-and-down direction of the vehicle) of the axle configuration 2a to be larger than an amount δa' of variable displacement upon application of the same load in the axial direction (left-and-right direction of the vehicle). As a result, by setting such a difference in the amounts of variable displacement (δb'>δa'), it is possible to improve the sound vibration performance without any substantial reductions in the driving stability.

Figure 8:
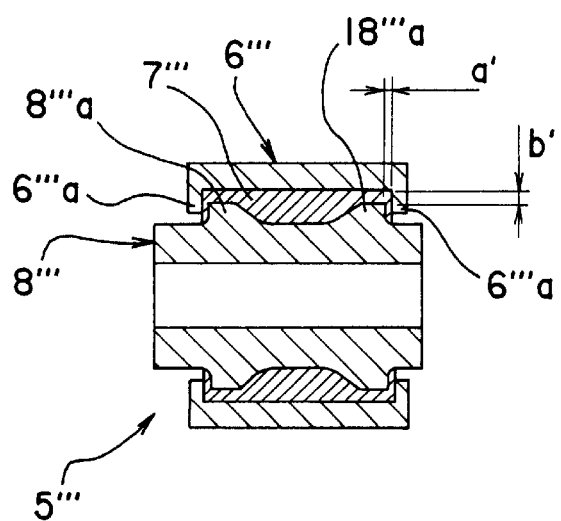
FIG. 8 is a vertical sectional view showing still yet another example of a vibration isolation mechanism used for the attaching structure of the automotive road wheel of the present invention.

FIG. 8 shows still yet another example of a vibration isolation

The vibration isolation mechanism 5'" shown in FIG. 8 is different from the one shown in FIG. 7 in that a concave enveloping bent portion 8'"b is formed in the center of the inner cylinder 8'".

Thus, since the enveloping bent portion 8'"b is formed in the center of the inner cylinder 8'", a volume of the damping material 7'" in the diameter direction (direction orthogonal to the axial direction) is increased more than that of the vibration isolation mechanism of FIG. 7, making it possible to further improve the sound vibration performance compared to the case of FIG. 7.

Figure 9:
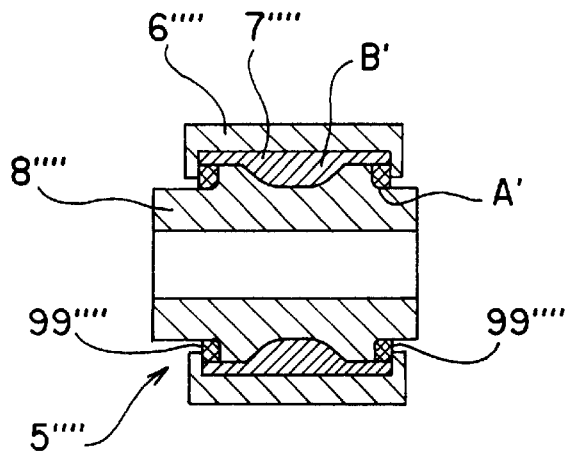
FIG. 9 is a vertical sectional view showing still yet another example of a vibration isolation mechanism used for the attaching structure of the automotive road wheel of the present invention.

FIG. 9 shows still yet another example of a vibration isolation mechanism used for the present invention.

This vibration isolation mechanism 5"" includes two types of damping materials different in an elastic modulus as the damping material 7"". Ring members 99"" of damping material A' of a larger elastic modulus is provided in a place held in the axial direction between the flange 6""a of the outer cylinder 6"" and the large-diameter portion 8""a of the inner cylinder 8""; and a damping material B' of an elastic modulus smaller than that of the damping material A' is provided in a place held in the diameter direction between the outer and inner cylinders 6"" and 8"".

Thus, since the two types of damping materials A' and B' having different elastic moduli (elastic modulus of A'>elastic modulus of B') are disposed between the outer and inner cylinders 6"" and 8"" as described above, it is possible to set the amount δb' of variable displacement upon application of a load to the vibration isolation mechanism 5"" in a direction orthogonal to the axial direction (up-and-down direction of the vehicle) to be larger than the amount δa' of variable displacement upon application of the same load in the axial direction (left-and-right direction of the vehicle). As a result, the sound vibration performance can be improved without any substantial reductions in the driving stability.

As described above, according to the automotive road wheel of the present invention, by providing the vibration isolation mechanism in the place where the disk portion is fastened to the axle portion of the vehicle, the vibration transmitted from the tire through the disk portion to the axle portion is damped by the vibration isolation mechanism, thereby improving the sound vibration performance. In addition, since the displacement in the axial direction at the fastening place is small, no substantial reductions occur in the driving stability. Moreover, since the vibration isolation mechanism can be mounted only by partially reconstructing the existing road wheel structure, a metal mold for the conventional road wheel can be directly used.

Furthermore, according to the attaching structure of the automotive road wheel of the present invention, by interposing the vibration isolation mechanism between the axle configuration and the axle hub, the vibration transmitted from the tire through the disk portion of the road wheel to the axle portion is damped by this vibration isolation mechanism, thereby improving the sound vibration performance. Moreover, since the displacement in the axial direction is small, no substantial reductions occur in the driving stability, and the vibration isolation mechanism can be mounted without any alterations to the existing road wheel.

Embodiments 1 to 3

Three types of automotive road wheels were manufactured, in which vibration isolation mechanisms including outer and inner cylinders made of stainless steel and damping materials made of rubber were constructed to have different structures respectively of the structure of FIG. 1 (embodiment 1), the structure of FIG. 3 (embodiment 2), and the structure of FIG. 4 (embodiment 3), and disk portions thereof were fastened to axle portions. In addition, for comparison, an automotive road wheel having no such vibration isolation mechanism was manufactured (conventional example 1).

By using these four types of automotive road wheels, ride comfort, road noise, and driving stability were measured according to an evaluation method below. A result is shown in Table 1.

Ride comfort, road noise, and driving stability

A pneumatic radial tire of a tire size 195/65R15 91S was mounted on each road wheel for measurement. Then, regarding the ride comfort, the road noise and the driving stability when the pneumatic radial tire was mounted for each of all wheels of a front-engine, rear-wheel drive vehicle also known as a FR vehicle of 2.5 liters, feeling tests were carried out by five trained panelists. A test evaluation was made on the basis of 5 points.

The evaluation was made based on an average value among three markings excluding maximum and minimum values of the markings made by the five panelists, and the evaluation value was indicated by an index with the conventional example set at 100. A larger index means better evaluation.

TABLE 1

|  | Conventional example 1 | Embodiment 1 | Embodiment 2 | Embodiment 3 |
| --- | --- | --- | --- | --- |
| Ride comfort | 100 | 110 | 107 | 107 |
| Road noise | 100 | 110 | 107 | 107 |
| Driving stability | 100 | 94 | 98 | 97 |

Notes: An index value 105 or above denotes a desirable result, while an index value 90 or above denotes a result acceptable practically.

Embodiments 4 to 6

Three types of automotive road wheel attaching structures were prepared, in which vibration isolation mechanisms including outer and inner cylinders made of stainless steel and damping materials made of rubber were constructed to have different structures respectively of the structure of FIG. 5 (embodiment 4), the structure of FIG. 8 (embodiment 5), and the structure of FIG. 9 (embodiment 6), and each mechanism is interposed between the axle configuration and the hub of the axle portion. In addition, for comparison, an automotive road wheel attaching structure having no such vibration isolation mechanism was prepared (conventional example 2).

By using these four types of automotive road wheel attaching structures, ride comfort, road noise, and driving stability were measured according to an evaluation method below. A result is shown in Table 2.

Ride comfort, road noise, and driving stability

A pneumatic radial tire of a tire size 205/65R15 94S (rim width of 6JJ) was mounted. Then, regarding the ride comfort, the road noise and the driving stability when the pneumatic radial tire was mounted for each of front wheels of a front-engine, front-wheel drive vehicle also known as a FF vehicle of 2.5 liters, feeling tests were carried out by five trained panelists. A test evaluation was made on the basis of 5 points.

The evaluation was made based on an average value among three markings excluding maximum and minimum values of the markings made by the five panelists, and the evaluation value was indicated by an index with the conventional example set at 100. A larger index means better evaluation.

TABLE 2

|  | Conventional example 2 | Embodiment 4 | Embodiment 5 | Embodiment 6 |
| --- | --- | --- | --- | --- |
| Ride comfort | 100 | 110 | 108 | 106 |
| Road noise | 100 | 108 | 106 | 106 |
| Driving stability | 100 | 98 | 98 | 98 |

Notes: An index value 105 or above denotes a desirable result, while an index value 90 or above denotes a result acceptable practically.

What is claimed is:

1. An automotive road wheel comprising:
   a disk portion fixed to an axle portion of a vehicle by a fastener; and
   a vibration isolation mechanism disposed concentrically about the fastener isolating contact between the disk portion and the axle portion.

2. The automotive road wheel according to claim 1, wherein the vibration isolation mechanism includes a damping material interposed between outer and inner cylinders, the outer cylinder is fixed to the disk portion, and the inner cylinder is fixed to the axle portion side by the fastener.

3. The automotive road wheel according to claim 2, wherein the damping material is any one of rubber, thermoplastic resin, and a thermoplastic resin elastomer composition prepared by blending thermoplastic resin with rubber.

4. The automotive road wheel according to any one of claims 1 to 3, wherein an amount of variable displacement $\delta b$ upon application of a load to the vibration isolation mechanism in a direction orthogonal to an axial direction of the fastener is larger than an amount $\delta a$ of variable displacement upon application of the same load in the axial direction.

5. The automotive road wheel according to one of claims 2 and 3, wherein a thickness a of the damping material held in the axial direction of the fastener between the outer and inner cylinders is smaller than a thickness b of the damping material held in a direction orthogonal to the axial direction.

6. The automotive road wheel according to one of claims 2 and 3, wherein a damping material A held in the axial direction of the fastener between the outer and inner cylinders is made different from a damping material B held in a direction orthogonal to the axial direction, and an elastic modulus of the damping material A is larger than an elastic modulus of the damping material B.

7. An attaching structure of an automotive road wheel, comprising:
   an axle hub connected to an axle configuration;
   a road wheel attached to the axle hub; and
   a vibration isolation mechanism disposed concentrically about the axle configuration and interposed between the axle configuration and the axle hub isolating contact between the axle configuration and the axle hub.

8. The attaching structure of an automotive road wheel according to claim 7, wherein the vibration isolation mechanism includes a damping material interposed between outer and inner cylinders, the outer cylinder is fixed to the hub side, and the inner cylinder is fixed to the axle configuration side.

9. The attaching structure of an automotive road wheel according to claim 8, wherein the damping material is one selected from the group consisting of rubber, thermoplastic resin, and a thermoplastic resin elastomer composition prepared by blending thermoplastic resin with rubber.

10. The attaching structure of an automotive road wheel according to one of claims 7 and 8, wherein the axle configuration is a non-drive shaft, and stiff pieces are respectively inserted in the damping material in front and rear sides of the non-drive shaft in the vehicle advancing direction.

11. The attaching structure of an automotive road wheel according to any one of claims 7 to 9, wherein an amount δb' of variable displacement upon application of a load to the vibration isolation mechanism in a direction orthogonal to an axial direction of the axle configuration is larger than an amount δa' of variable displacement upon application of the same load in the axial direction.

12. The attaching structure of an automotive road wheel according to one of claims 8 and 9, wherein a thickness a' of the damping material held in the axial direction of the axle configuration between the outer and inner cylinders is smaller than a thickness b' of the damping material held in a direction orthogonal to the axial direction.

13. The attaching structure of an automotive road wheel according to one of claims 8 and 9, wherein a damping material A' held in the axial direction of the axle configuration between the outer and inner cylinders is made different from a damping material B' held in a direction orthogonal to the axial direction, and an elastic modulus of the damping material A' is larger than an elastic modulus of the damping material B'.

* * * * *

UNITED STATES PATENT AND TRADEMARK OFFICE
CERTIFICATE OF CORRECTION

PATENT NO. : 6,565,158 B2
DATED : May 20, 2003
INVENTOR(S) : Shinji Seimiya

It is certified that error appears in the above-identified patent and that said Letters Patent is hereby corrected as shown below:

<u>Title page,</u>
Item [30], Foreign Application Priority Data, should read:
-- December 11, 2000   (JP)          2000-375667
   December 11, 2000   (JP)          2000-376402 --

Signed and Sealed this

Twenty-sixth Day of October, 2004

JON W. DUDAS
*Director of the United States Patent and Trademark Office*